(12) United States Patent
Karaoguz et al.

(10) Patent No.: US 7,475,243 B2
(45) Date of Patent: Jan. 6, 2009

(54) PREVENTING A NON-HEAD END BASED SERVICE PROVIDER FROM SENDING MEDIA TO A MEDIA PROCESSING SYSTEM

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 680 days.

(21) Appl. No.: 10/672,737

(22) Filed: Sep. 26, 2003

(65) Prior Publication Data

US 2004/0117659 A1    Jun. 17, 2004

Related U.S. Application Data

(60) Provisional application No. 60/466,946, filed on Apr. 30, 2003, provisional application No. 60/465,982, filed on Apr. 28, 2003, provisional application No. 60/464,697, filed on Apr. 23, 2003, provisional application No. 60/457,179, filed on Mar. 25, 2003, provisional application No. 60/443,894, filed on Jan. 30, 2003, provisional application No. 60/432,472, filed on Dec. 11, 2002.

(51) Int. Cl.
*H04L 9/00* (2006.01)

(52) U.S. Cl. .......................... 713/168; 726/3; 380/211

(58) Field of Classification Search ................ 713/155, 713/168
See application file for complete search history.

(56) References Cited

U.S. PATENT DOCUMENTS

| 4,554,579 | A  | * | 11/1985 | Citta ........................ 725/131 |
| 4,638,356 | A  | * | 1/1987  | Frezza ...................... 380/200 |
| 6,393,478 | B1 | * | 5/2002  | Bahlmann ................... 709/224 |
| 6,996,238 | B2 | * | 2/2006  | Candelore ................... 380/278 |
| 2002/0041337 | A1 | * | 4/2002 | Candelore ................... 348/591 |
| 2003/0126608 | A1 | * | 7/2003 | Safadi et al. ................. 725/89 |
| 2004/0088180 | A1 | * | 5/2004 | Akins, III ..................... 705/1 |

\* cited by examiner

*Primary Examiner*—Gilberto Barron, Jr.
*Assistant Examiner*—Samson B Lemma
(74) *Attorney, Agent, or Firm*—McAndrews, Held & Malloy, Ltd.

(57) ABSTRACT

Systems and methods that prevent unauthorized access in a communications network are provided. In one embodiment, a system that prevents unauthorized access to a network device may include, for example, a network device and a headend. The headend may be coupled to a communications network. The network device may be deployed in a home environment and may be communicatively coupled to the communications network via the headend. The headend may be adapted, for example, to determine whether a request to access the network device is authorized.

27 Claims, 12 Drawing Sheets

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

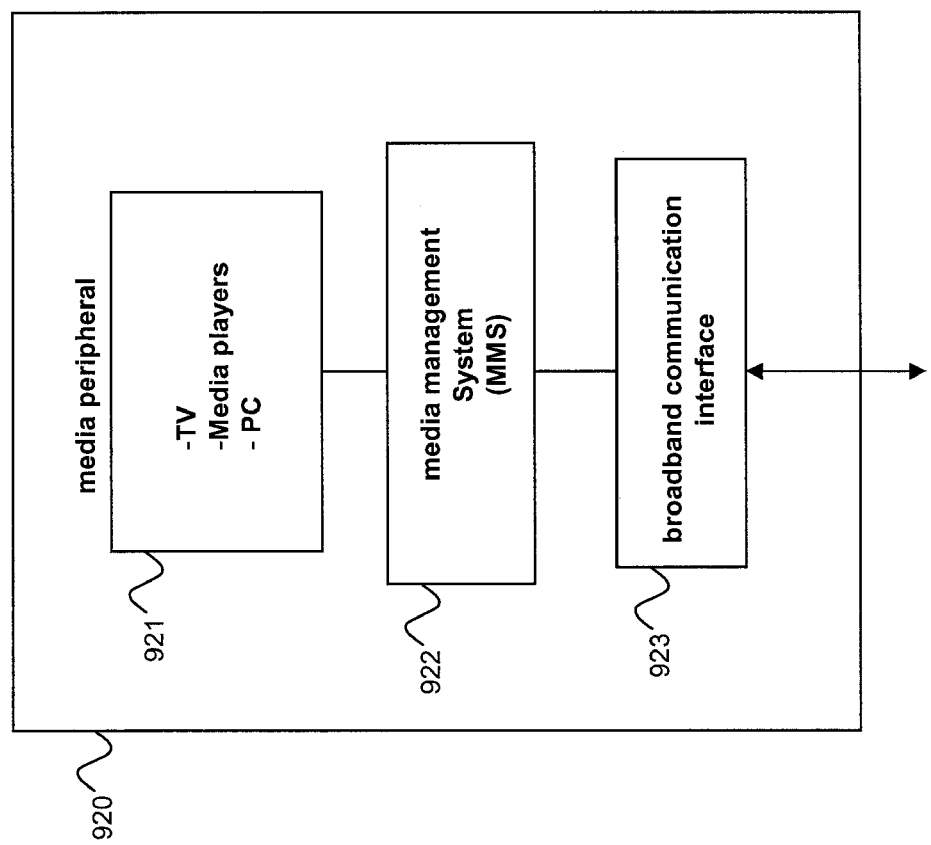

PREVENTING A NON-HEAD END BASED SERVICE PROVIDER FROM SENDING MEDIA TO A MEDIA PROCESSING SYSTEM

CROSS-REFERENCE TO RELATED APPLICATIONS/INCORPORATION BY REFERENCE

This application makes reference to, claims priority to and claims benefit from U.S. patent application Ser. No. 60/466,946, entitled "Preventing a Non-Head End Based Service Provider from Sending Media to a Media Processing System" and filed on Apr. 30, 2003; U.S. patent application Ser. No. 60/457,179, entitled "Server Architecture Supporting a Personal Media Exchange Network" and filed on Mar. 25, 2003; U.S. patent application Ser. No. 60/464,697, entitled "Secure Linking with Authentication and Authorization in a Media Exchange Network" and filed on Apr. 23, 2003; U.S. patent application Ser. No. 60/465,982, entitled "Secure Anonymity in a Media Exchange Network" and filed on Apr. 28, 2003; U.S. patent application Ser. No. 60/432,472, entitled "Personal Inter-Home Media Exchange Network" and filed on Dec. 11, 2002; and U.S. patent application Ser. No. 60/443,894, entitled "Access and Control of Media Peripherals Via a Media Processing System" and filed on Jan. 30, 2003. The complete subject matter of the above-identified applications are hereby incorporated herein by reference in their entirety.

In addition, this application makes reference to U.S. patent application Ser. No. 10/657,390, entitled "Personal Inter-Home Media Exchange Network" and filed on Sep. 8, 2003; and U.S. patent application Ser. No. 10/660,267, entitled "Personal Access and Control of Media Peripherals on a Media Exchange Network" and filed on Sep. 11, 2003. The complete subject matter of the above-identified applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Communication in a personal computer (PC) based environment having Internet connectivity is typically established based on e-mail addresses and/or Internet protocol (IP) addresses. Many unwanted connections occur with no anonymity or control over who communicates with whom.

A user of a PC may receive many unwanted e-mail messages with file attachments (e.g., SPAM) because the user's e-mail address is widely distributed or published somewhere. Some of the e-mail messages may contain computer viruses that can hurt the user's PC. Many businesses and some individual users set up firewalls to prevent certain types of e-mail messages from getting through, especially those e-mail messages having computer viruses. However, in general, e-mail messages flow across the Internet without the performance of any type of authorization or authentication.

A cable service provider or a satellite service provider may authorize which channels to broadcast and/or to be de-encrypted by a particular user based on the subscription information for that user. In general, a set-top box in a user's home receives whatever is broadcast to it based on the subscription of the user. A service provider could temporarily override the subscription limits and broadcast certain channels to a user's set-top box to let the user try those channels out. In reality, the user essentially has no control of what channels may be broadcast to him.

In general, when dealing with IP-based networks and communication through devices that have IP addresses, sharing any kind of digital media invites or facilitates different ways for rogue service providers or rogue networks to be formed to imitate and to copy legitimate services on the network.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in, for example, systems and methods that prevent unauthorized access in a communications network. In one embodiment, the present invention may provide a system that prevents unauthorized access to a network device. The system may include, for example, a network device and a headend. The headend may be coupled to a communications network. The network device may be deployed in a home environment and may be communicatively coupled to the communications network via the headend. The headend may be adapted, for example, to determine whether a request to access the network device is authorized.

In another embodiment, the present invention may provide a method that prevents unauthorized access in a communications network. The method may include, for example, one or more of the following: receiving, at a headend, a request to access a first device, the request originating from a second device; determining, by the headend, whether the second device is authorized to access the first device; and blocking the second device from accessing the first device if the headend determines that the second device is not authorized to access the first device.

In yet another embodiment, the present invention may provide a method that prevents unauthorized access in a communications network. The method may include, for example, one or more of the following: disposing a headend between a first network device and a second network device such that a communications path between the second network device and the first network device passes through the headend; and adapting the headend to determine whether the second device is authorized to access the first device.

These and other advantages, aspects and novel features of the present invention, as well as details of an illustrated embodiment thereof, will be more fully understood from the following description and drawings.

BRIEF DESCRIPTION OF THE DRAWINGS

FIG. 8 is an exemplary illustration of a TV guide channel user interface showing several options of a pushed media in accordance with an embodiment of the present invention.

FIG. 9B illustrates an embodiment of an MPS in accordance with the present invention.

DETAILED DESCRIPTION OF THE INVENTION

Figure 1:
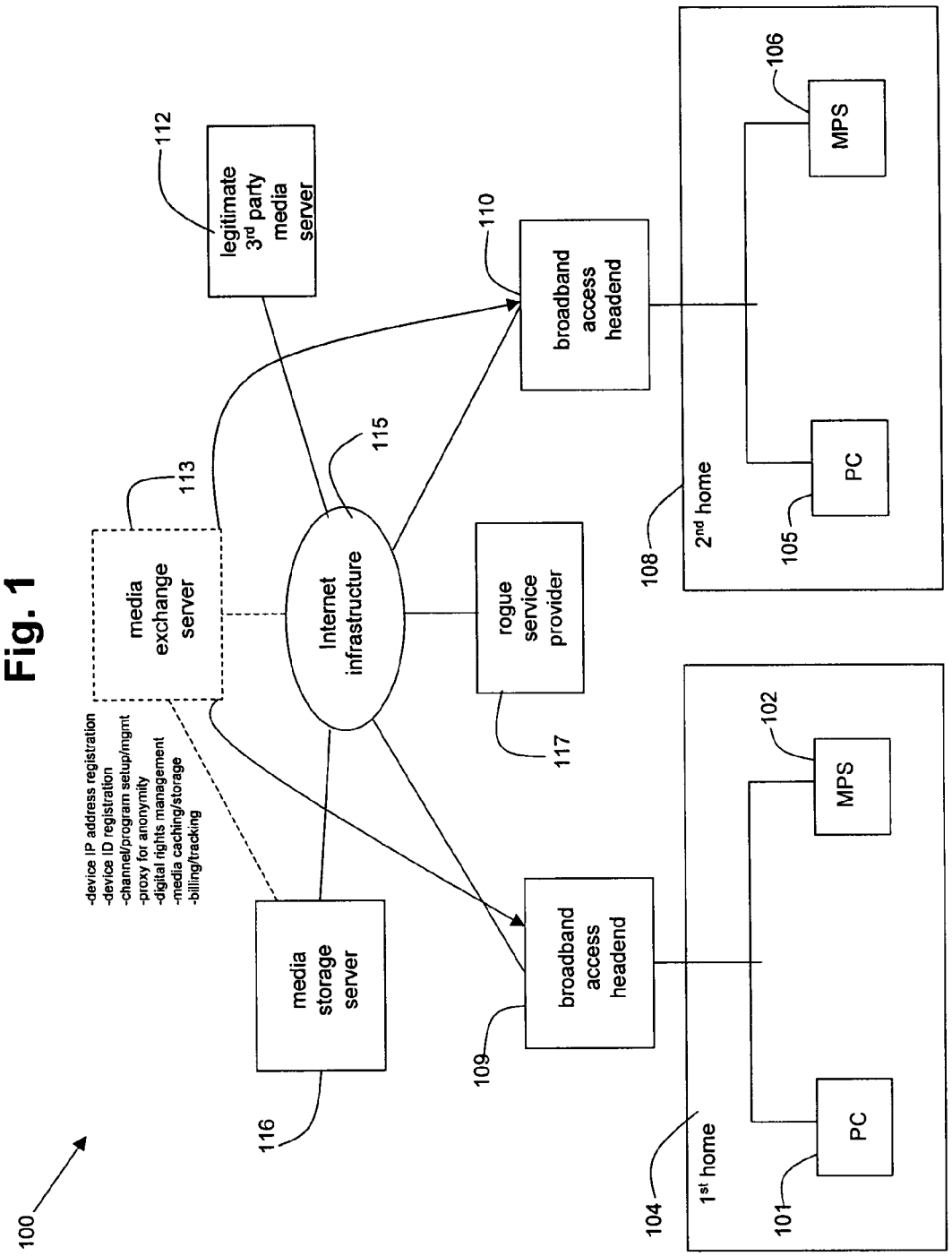
FIG. 1 is a diagram illustrating an embodiment of a media exchange network preventing a non-headend based service provider from sending media to a device on a media exchange network, in accordance with various aspects of the present invention.

FIG. 1 is a diagram illustrating an embodiment of a media exchange network 100 preventing a rogue service provider from sending media to a device on a media exchange network, in accordance with various aspects of the present invention. Specifically, the media exchange network 100 is a communication network comprising a personal computer (PC) 101 and a media processing system (MPS) 102 at a $1^{st}$ home 104; and a PC 105 and an MPS 106 at a $2^{nd}$ home 108. The PC 101 and the MPS 102 interface to a broadband access headend 109. The broadband access headend 109 may comprise at least one of a cable headend, a satellite headend and a DSL headend, in accordance with various embodiments of the present invention. The PC 101 and the MPS 102 may include internal modems (e.g., a cable modem or a digital subscriber line (DSL) modem) or other interface devices to communicate with the broadband access headend 109. Optionally, the interface device (e.g., a modem) may be external to the PC 101 and the MPS 102.

Similarly, the PC 105 and the MPS 106 interface to a broadband access headend 110. The broadband access headend 110 may comprise at least one of a cable headend, a satellite headend and a DSL headend, in accordance with various embodiments of the present invention. The PC 105 and the MPS 106 may include internal modems (e.g., a cable modem or a DSL modem) or other interface device to communicate with the broadband access headend 110. Optionally, the interface device (e.g., a modem) may be external to the PC 105 and the MPS 106.

In accordance with various embodiments of the present invention, an MPS may comprise at least one of a set-top box (STB), a PC and a television (TV) with a media management system (MMS). An MMS is also known herein as a media exchange software (MES) platform.

An MMS comprises a software platform operating on at least one processor to provide certain functionality including user interface functionality, distributed storage functionality and networking functionality. For example, an MMS may provide control of media peripheral devices, status monitoring of media peripheral devices and inter-home MPS routing selection, in accordance with an embodiment of the present invention.

The media exchange network 100 further comprises a legitimate $3^{rd}$ party media server 112 and the functionality of a media exchange server 113 (e.g., as in the case of a single central server supporting the media exchange network 100) integrated into the broadband access headends 109 and 110. The broadband access headend 109, the broadband access headend 110, the legitimate $3^{rd}$ party media server 112 and the media exchange server 113 connect to the Internet infrastructure 115.

The legitimate $3^{rd}$ party media server 112 may comprise any of a number of providers of digital media including an on-demand movie provider, an advertiser and an on-demand music provider and is a legitimate service provider on the media exchange network 100. The $3^{rd}$ party media server 112 may store movies, video, user profiles and other digital media that may be provided to users of the media exchange network 100.

The media exchange network 100 also comprises a media storage server 116 interfacing to the Internet infrastructure 115. The media storage server 116 interacts with the media exchange server 113 and provides temporary storage and/or archival storage for digital media on the media exchange network 100. For example, the media storage server 116 may temporarily hold media files that are addressed to certain MPS's and/or PC's on the media exchange network 100.

The media exchange network 100 further comprises a rogue service provider 117 that interfaces to the Internet infrastructure 115 but attempts to circumvent the security and anonymity features of the media exchange network 100 to push media to the MPS's and PC's on the media exchange network 100 without authorization. A rogue service provider may be defined as, for example, an illegitimate $3^{rd}$ party service provider that attempts to push media to devices on a media exchange network even though those devices do not desire the media.

The media exchange server functionality, which may be incorporated, at least in part, into the broadband access headends, includes device IP address registration, device ID registration, channel/program setup and management, serving as a proxy for anonymity, digital rights management, media caching/storage, and billing/tracking. When the functionality of a media exchange server is integrated into a broadband access headend, the broadband access headend may then be considered a media exchange headend.

Figure 2:
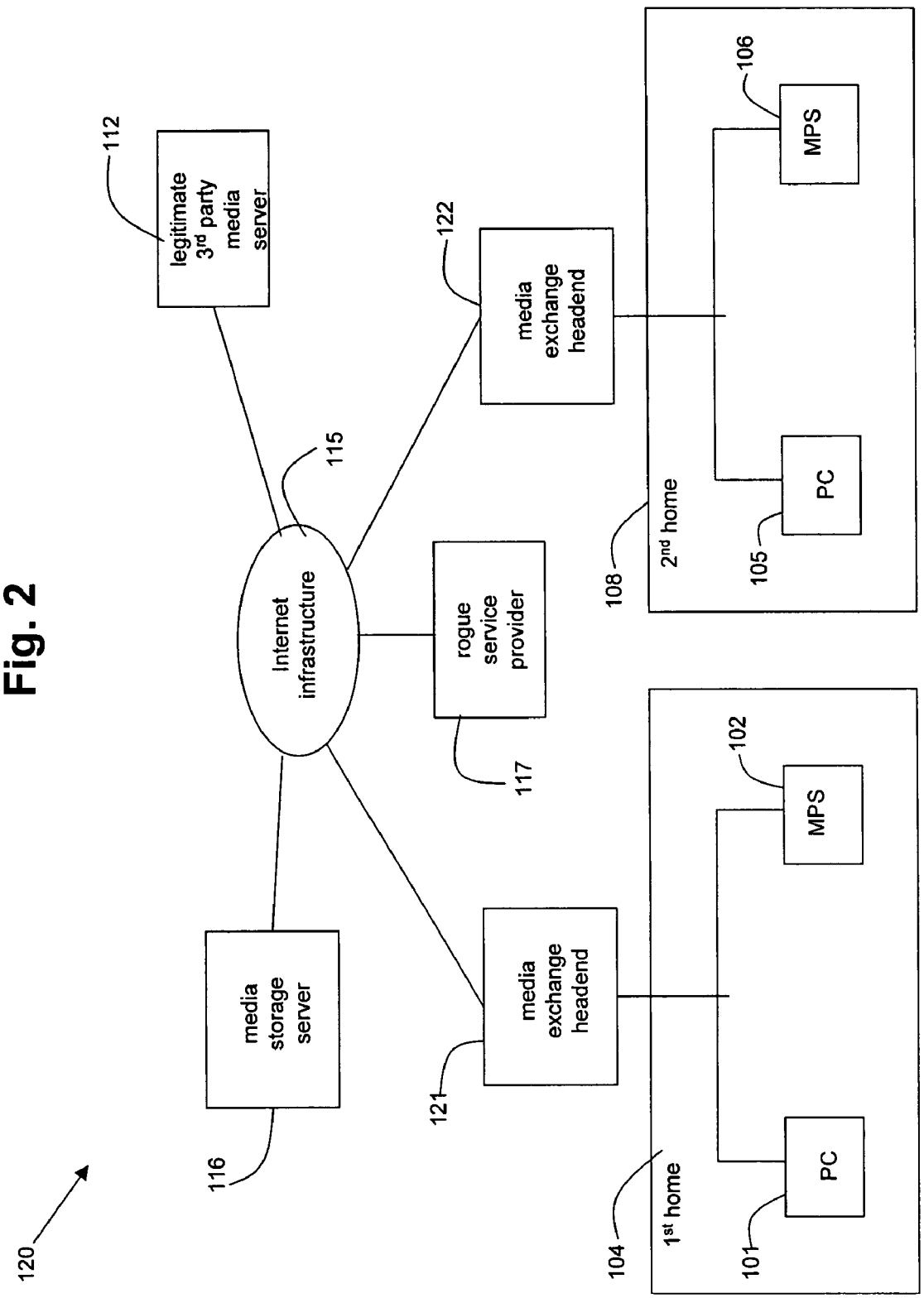
FIG. 2 is a diagram illustrating an embodiment of a media exchange network clearly showing the resultant media exchange headends which incorporate the functionality of the media exchange server of FIG. 1 into the broadband access headends of FIG. 1, in accordance with various aspects of the present invention.

FIG. 2 is a diagram illustrating an embodiment of a media exchange network 120 clearly showing the resultant media exchange headends 121 and 122 which incorporate the functionality of the media exchange server 113 of FIG. 1 into the broadband access headends 109 and 110 of FIG. 1, in accordance with various aspects of the present invention. The media exchange network 120 is equivalent to the media exchange network 100 of FIG. 1, except the media exchange server 113 is not shown since the functionality of the media exchange server 113 has been incorporated into the broadband access headends 109 and 110 resulting in the media exchange headends 121 and 122.

The media exchange network 120, with the functionality of the media exchange server 113 incorporated into the headends 121 and 122, solves the problem of preventing a rogue service provider 117 from gaining access to a PC or an MPS on the media exchange network 100 via the Internet infrastructure 115 and a broadband access headend.

The various elements of the media exchange network 120 include storage locations for digital media and data. The storage locations may comprise, for example, hard disk drives, a DVD player, a CD player, floppy disk drives, RAM or any combination of these. The storage locations may also include, for example, memory sticks, PCMCIA cards, compact flash cards or any combination of these.

The PC's (101 and 105) may comprise desktop PC's, notebook PC's, PDA's or any computing device.

In some embodiments of the present invention, the MPS's (102 and 106) are essentially enhanced set-top boxes. The MPS's (102 and 106) may each include a TV screen for viewing and interacting with various user interfaces, media, data and services that are available on the media exchange network using, for example, a remote control. The PC's 101 and 105 may each include a PC monitor for viewing and interacting with various user interfaces, media, data and services that are available on the media exchange network using, for example, a keyboard and mouse. The MPS's (102 and 106) and PC's (101 and 105) include functional software to support interaction with the media exchange headends 121 and 122 on the media exchange network 120, in accordance with various embodiments of the present invention.

Other embodiments of the present invention may comprise various combinations and/or multiple instantiations of the elements of FIG. 2, in accordance with various aspects of the present invention, including media peripheral devices such as, for example, digital cameras, digital camcorders, MP3 players, etc.

Referring to FIG. 1, if the functionality of the media exchange server is truly provided by a separate central server 113 and if the broadband access headends do not include any functionality of the media exchange server 113, then a rogue service provider might be able to circumvent the security and anonymity features of the media exchange network 100 provided by the media exchange server 113. The rogue service provide may then be able, for example, to access media in (e.g., to push media to) the MPS's and PC's on the media exchange network 100 without authorization.

Without the functionality of the media exchange server within the headends, the broadband access headends 109 and 110 would just be physical plants providing broadband access to devices on the media exchange network and would not have any information about the kind of data or media being passed through the headends. Since the media exchange network 100 may be IP-based, the rogue service provider 117 may be able to intercept an IP address and to push media to, for example, the MPS 106 (e.g., even though the MPS 106 does not desire media from the rogue service provider 117) via the Internet infrastructure 115 and the broadband access headend 110, without authorization from the media exchange server 113. A device on the media exchange network (e.g., an MPS or a PC) has a device ID and an IP address. By having the functionality of the media exchange server within the headend, traffic on the media exchange network can be controlled. A rogue service provider may not connect to an MPS, for example, without the knowledge of the headend.

By incorporating the functionality of the media exchange server 113 into the broadband access headends 109 and 110 resulting in the media exchange headends 121 and 122, the rogue service provider 117 may be prevented from accessing, for example, the MPS 106. The functionality of the media exchange server in the media exchange headends prevents the rogue service provider 117 from gaining access to the MPS 106 on the media exchange network 120. The media exchange headends 121 and 122 use the various techniques of registration, authentication, digital rights management and billing as described in, for example, U.S. Patent Application Ser. No. 60/457,179 filed on Mar. 25, 2003, U.S. Patent Application Ser. No. 60/464,697 filed on Apr. 23, 2003, and U.S. Patent Application Ser. No. 60/465,982 filed on Apr. 28, 2003 to prevent the rogue service provider 117 from pushing media to a device on the media exchange network 120. The complete subject matter of the above-identified applications are hereby incorporated herein by reference in their entirety In accordance with various embodiments of the present invention, multiple rogue service providers may be prevented from gaining access to devices on a media exchange network by incorporating functionality of a media exchange server into multiple broadband access headends.

As an alternative embodiment of the present invention, the media exchange server functionality may be in a separate, central server on the media exchange network (i.e., outside of the headend). A rogue service provider may be prevented from accessing a device (e.g., an MPS or a PC) on the media exchange network by the media exchange server. In such an embodiment of the present invention, the media exchange server uses authentication and encryption techniques, as described in, for example, U.S. Patent Application Ser. No. 60/464,697 filed on Apr. 23, 2003, to counter the rogue service provider.

A substantial challenge is to be able to transfer and share many different types of digital media, data and services between one device/location and another with ease while being able to index, manage and store the digital media and data.

For example, it is desirable to be able to distribute and store many types of digital media in a PC and/or a television environment in a user-friendly manner without using many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data and/or services to be stored, indexed, viewed, searched for, pushed from one user to another and requested by users via a TV channel guide look-and-feel user interface. The media exchange network also allows a user to construct personal media channels that comprise personal digital media (e.g., captured digital pictures, digital video, digital audio, etc.), request that third-party media channels be constructed from third-party digital media and access the media channels pushed to him by other users on the media exchange network.

PC's may be used but are not required to interface to the media exchange network for the purpose of exchanging digital media, data and services. Instead, set-top boxes or integrated MPS's may be used with the media exchange network to perform all of the previously described media exchange functions using a remote control with a television screen.

Current set-top boxes may be software enhanced to create an MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data and services as well as for bringing the conventional television channels to a user's home. An MPS and/or a PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
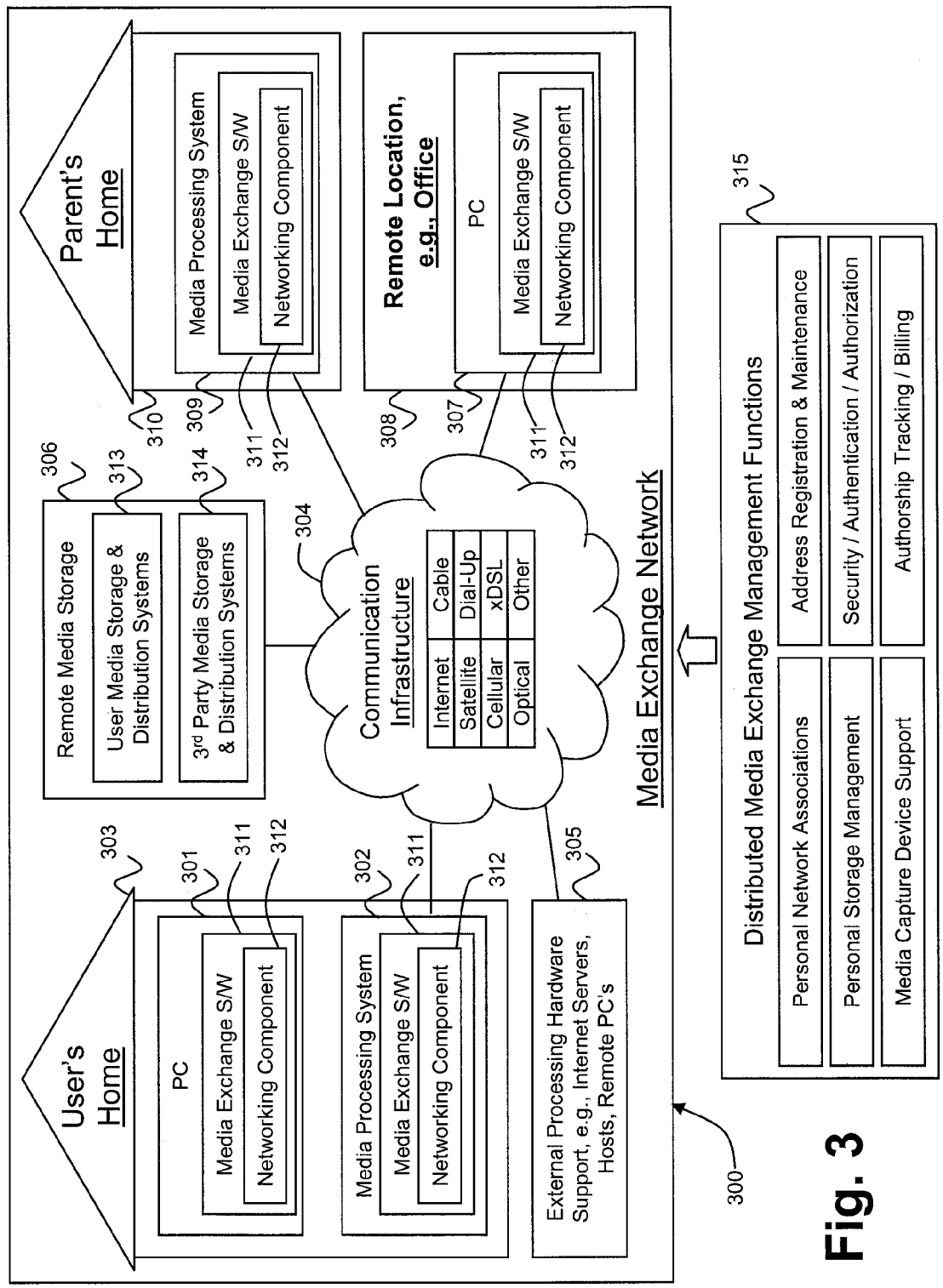
FIG. 3 is a schematic block diagram of a first exemplary media exchange network in accordance with an embodiment of the present invention.

FIG. 3 illustrates a media exchange network 300 for exchanging and sharing digital media, data and services in accordance with an embodiment of the present invention. The media exchange network 300 is a secure, closed network environment that is only accessible to pre-defined users and service providers. The media exchange network of FIG. 3 comprises a first PC 301 and a first MPS 302 at a user's home 303, a communication infrastructure 304, an external processing hardware support 305, a remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service and an integrated TV channel guide look-and-feel.

The external processing hardware support 305 comprises at least one server such as a centralized internet server, a peer-to-peer server or a cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of an internet infrastructure, a satellite infrastructure, a cable infrastructure, a dial-up infrastructure, a cellular infrastructure, an xDSL infrastructure, an optical infrastructure or some other infrastructure. The communication infrastructure 304 links the user's home 303, the parent's home 310, the remote media storage 306 and the remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
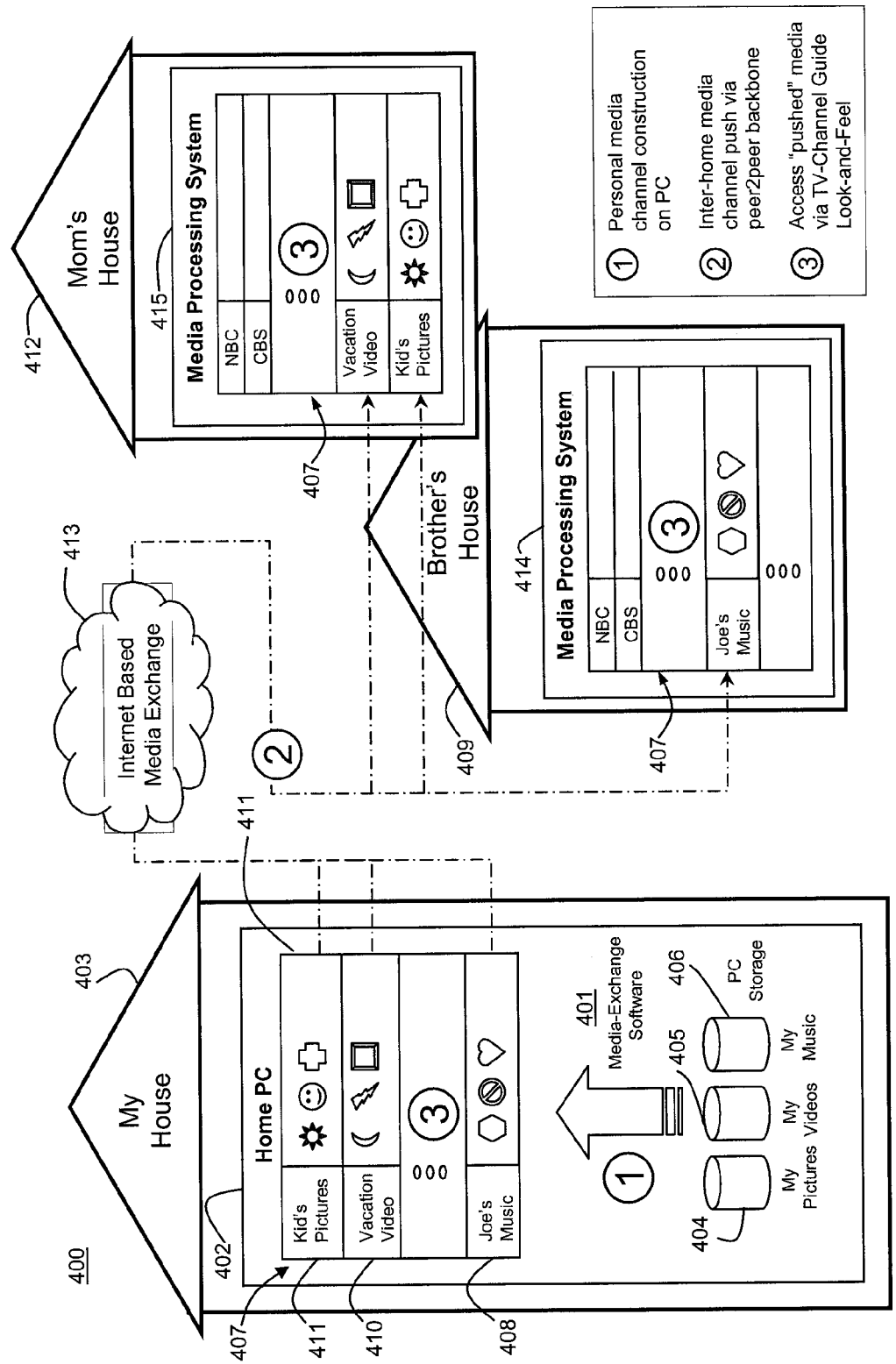
FIG. 4 is a schematic block diagram of performing personal media exchange over a second exemplary media exchange network in accordance with an embodiment of the present invention.

FIG. 4 illustrates an example of a personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
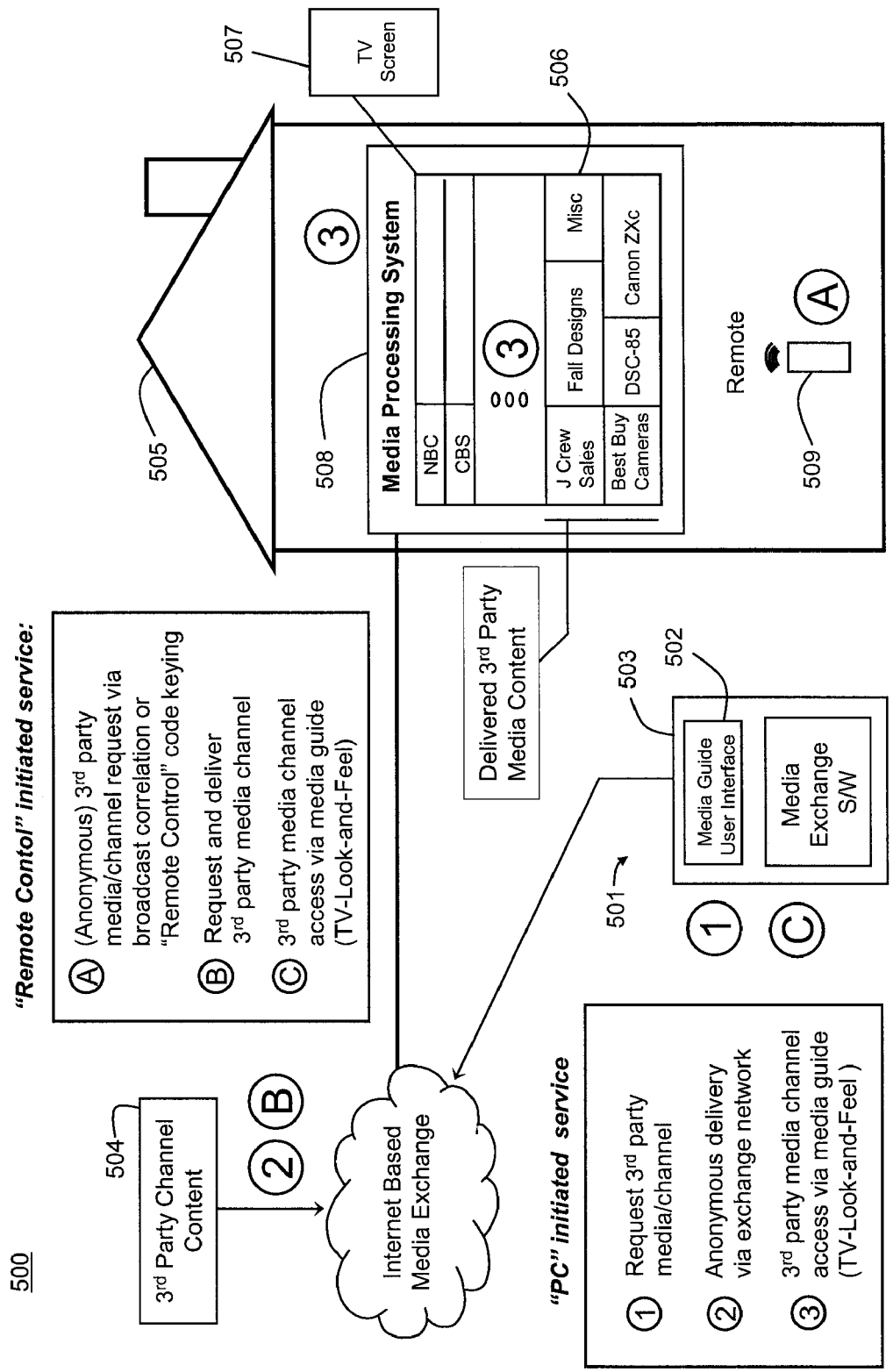
FIG. 5 is a schematic block diagram of performing third-party media exchange over a third exemplary media exchange network in accordance with an embodiment of the present invention.

FIG. 5 illustrates an example of a third-party media exchange over a media exchange network 500 in accordance with an embodiment of the present invention. In step 1, a PC-initiated third-party request is made by a first party 501 via an Internet-based media exchange network 500 using a TV channel guide look-and-feel user interface 502 on a PC 503. In step 2, an anonymous delivery of the requested third-party channel 504 is made to a second party 505 via the Internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an Internet-based media exchange network 500 using a TV channel guide look-and-feel user interface 506 on a TV screen 507 using a remote control 509. The second party 505 may key in a code, using the remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
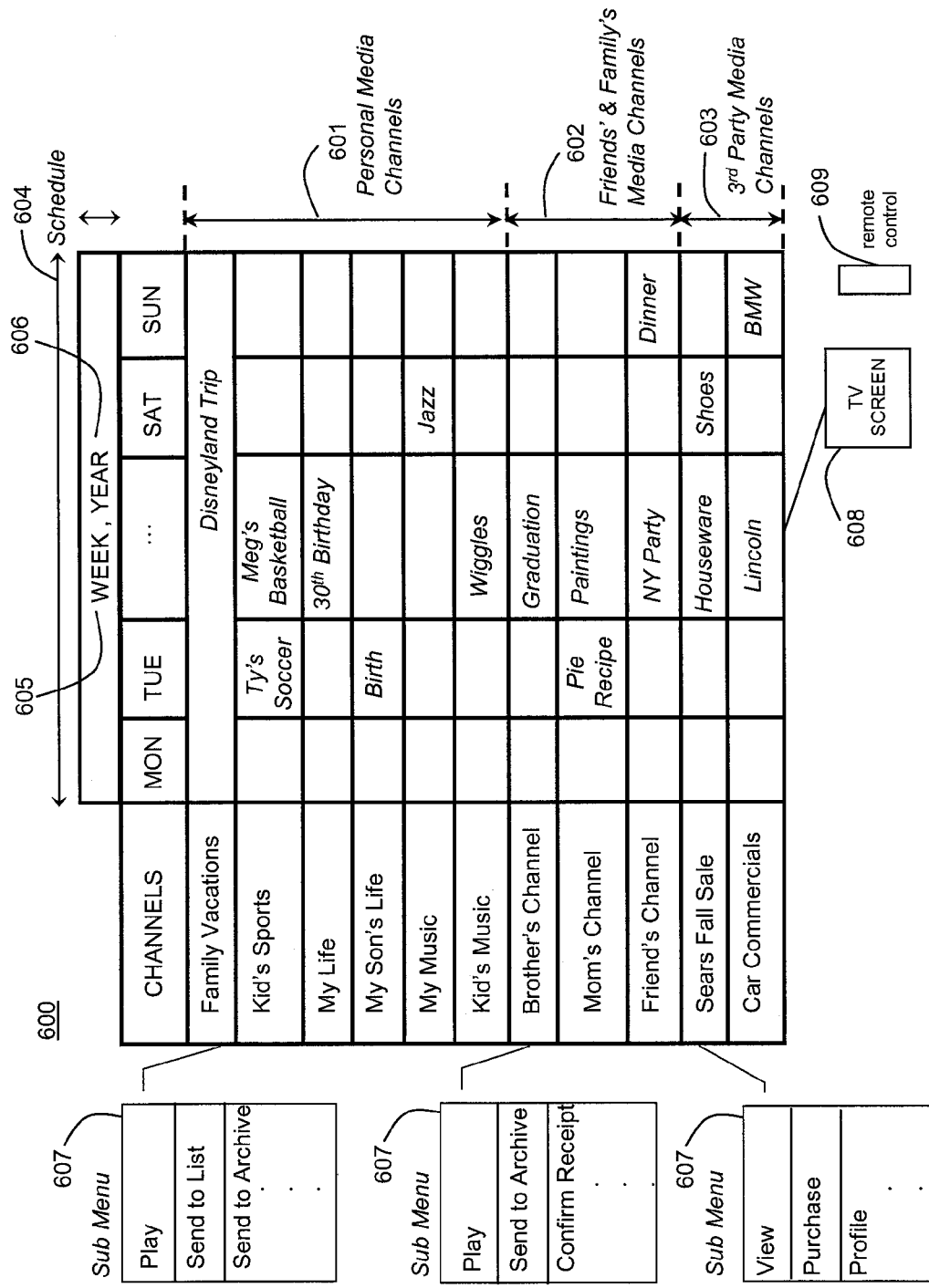
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase" and "profile".

Figure 7:
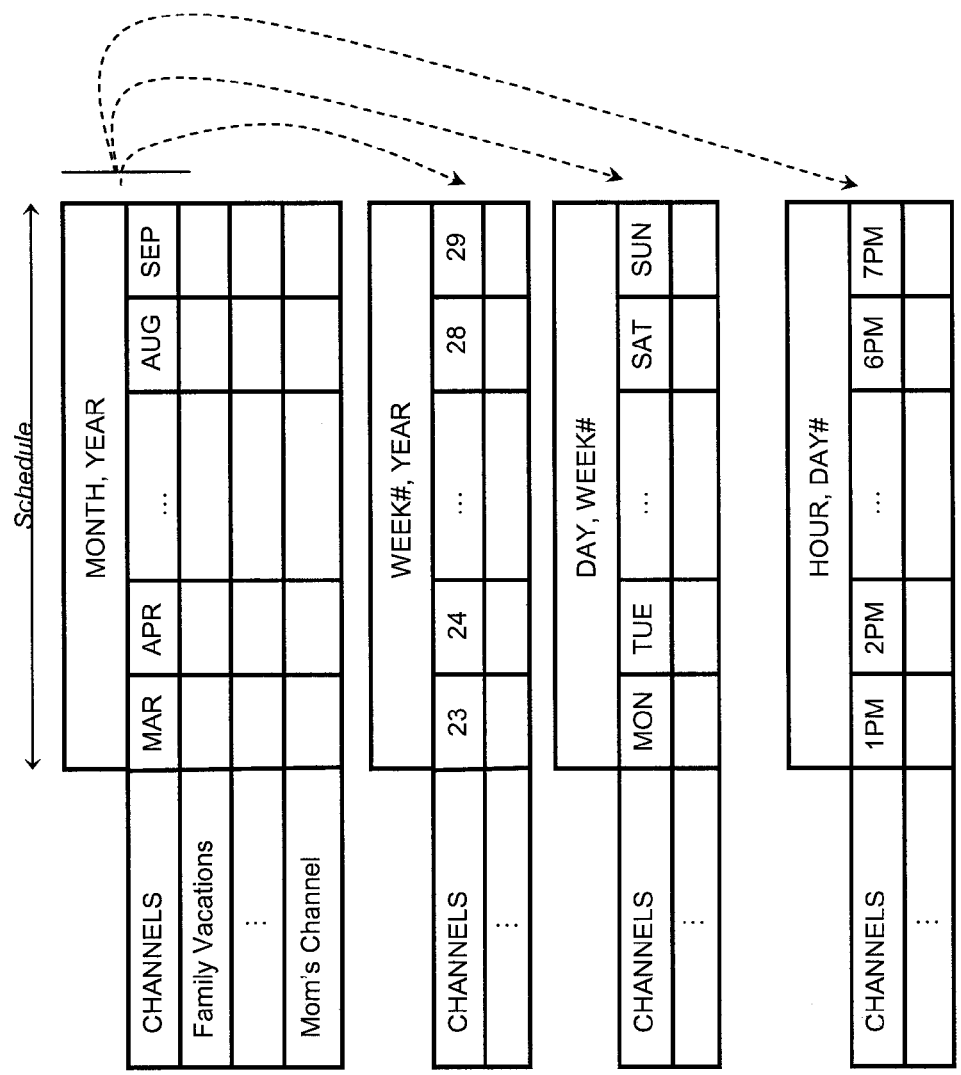
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#" or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for accepting and downloading the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
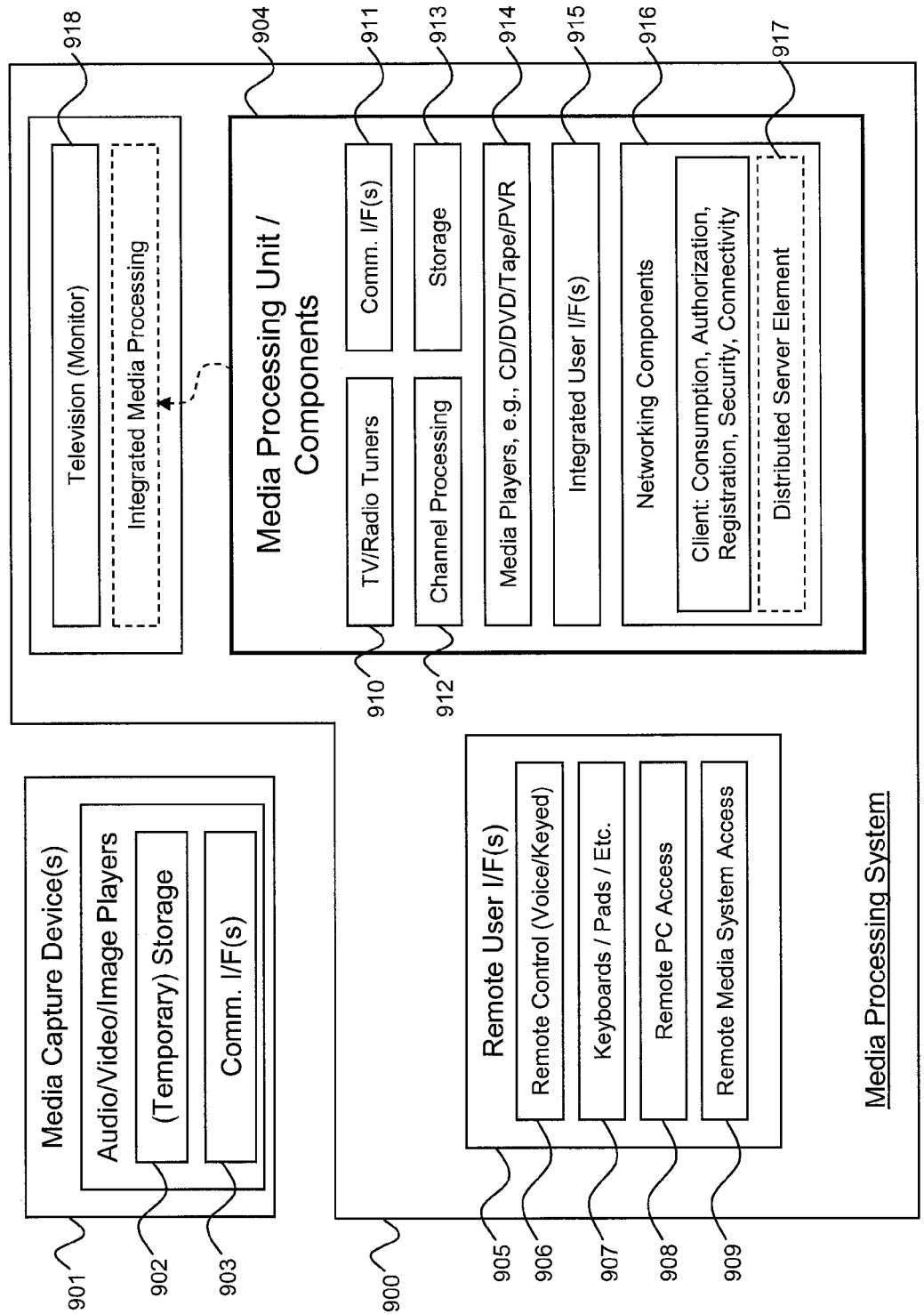
FIG. 9A is a schematic block diagram of a media processing system (MPS) interfacing to media capture peripherals in accordance with an embodiment of the present invention.

FIG. 9A illustrates some elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908 and a remote media system access interface 909 (i.e., providing access from another MPS).

The media processing unit (MPU) 904 comprises TV and radio tuners 910 for image and audio consumption, communications interfaces 911, channel processing 912 (e.g., creating, storing, indexing and viewing), storage 913, media players 914 (e.g., CD players, DVD players, tape players, PVRs and MP3 players), an integrated user interface 915 (to provide a TV channel guide look-and-feel, for example), networking components 916 to provide client functions such as consumption (e.g., billing), authorization (e.g., using digital certificates and digital ID's), registration, security and connectivity. In an alternative embodiment of the present invention, the networking components 916 may include a distributed server element 917 that is part of a distributed server.

FIG. 9B illustrates an embodiment of a media processing system (MPS) 920 in accordance with various aspects of the present invention. The MPS 920 is essentially an enhanced set-top box for viewing and interacting with various user interfaces, media, data and services that are available on the media exchange network using, for example, a remote control. The MPS 920 comprises a media peripheral 921, a media management system (MMS) 922 and a broadband communication interface 923.

The media peripheral 921 may include a TV, a PC and media players (e.g., a CD player, a DVD player, a tape player and a MP3 player) for video, image and audio consumption of broadcast channels and/or personal channels. The broadband communication interface 923 may include internal modems (e.g., a cable modem or a DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service and a media guide user interface providing an integrated TV channel guide look-and-feel.

Figure 10:
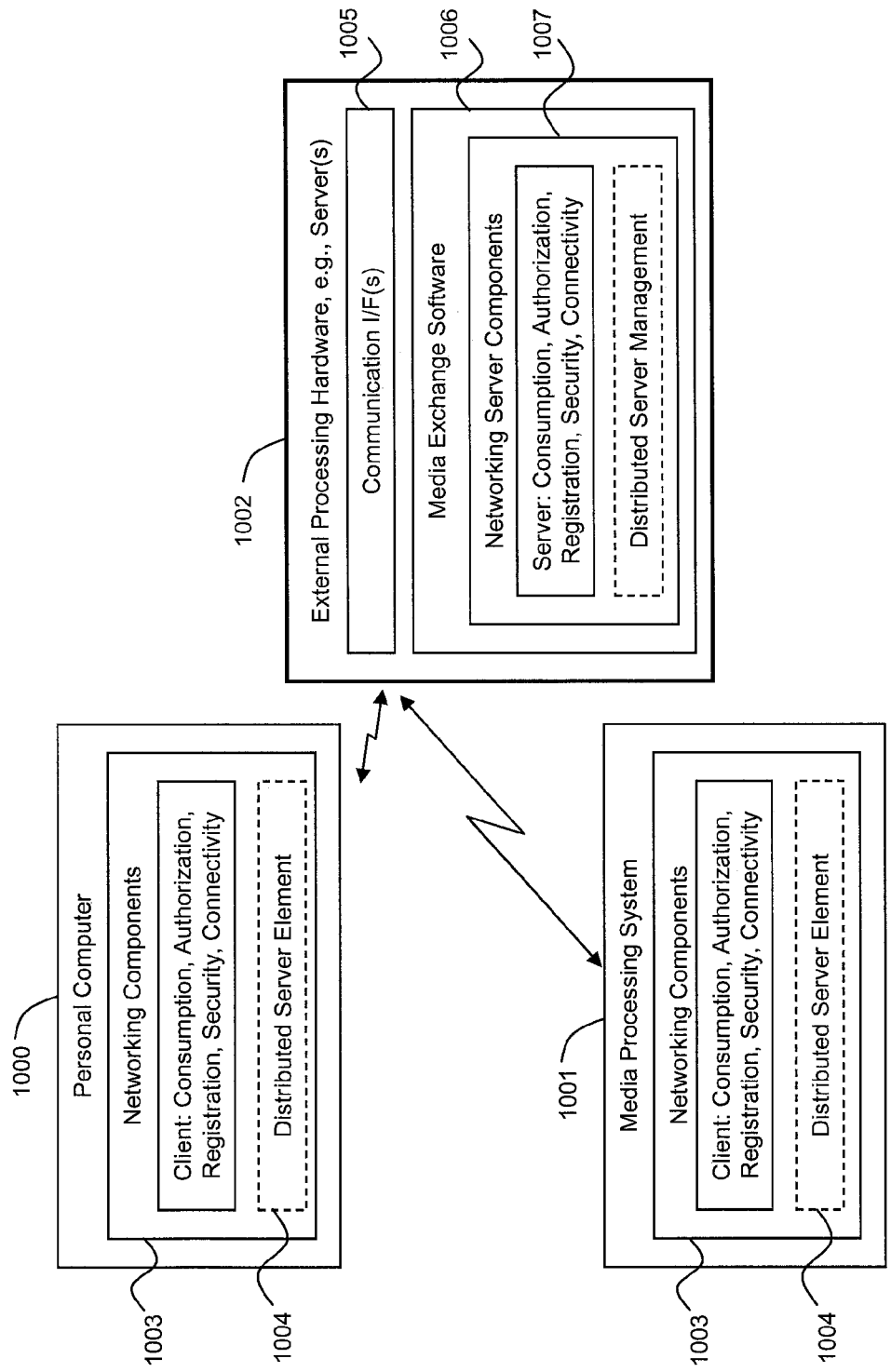
FIG. 10 is a schematic block diagram of a PC and an MPS interfacing to a server on a media exchange network in accordance with an embodiment of the present invention.

FIG. 10 illustrates connectivity between a PC 1000, an MPS 1001 and an external processing hardware 1002 (e.g., a server) in accordance with an embodiment of the present invention. The PC 1000 and the MPS 1001 include networking components 1003 to provide client functions such as consumption (e.g., billing), authorization, registration, security and connectivity. Alternatively, the PC 1000 and the MPS 1001 may include a distributed server element 1004 that is part of a distributed server.

The PC 1000 and the MPS 1001 connect to the external processing hardware 1002 via wired connections or wireless connections. The external processing hardware 1002 comprises a distributed server or a peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and the MPS 1001 which may also use the same MES platform 1006. The external processing hardware 1002 also includes networking server components 1007 to provide the similar client functions such as consumption (e.g., billing), authorization, registration, security and connectivity at the server side.

Figure 11:
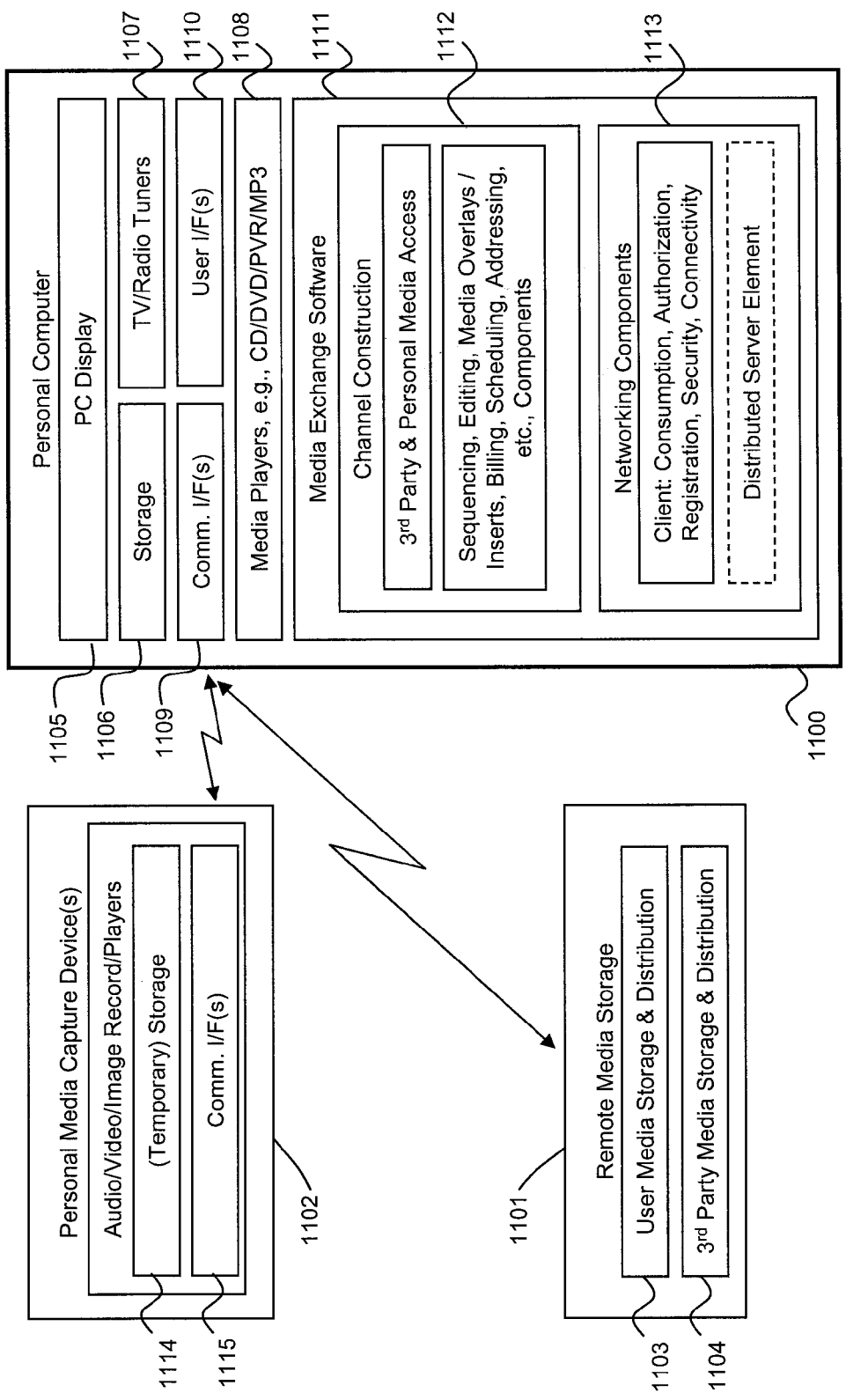
FIG. 11 is a schematic block diagram of a PC interfacing to personal media capture devices and remote media storage on a media exchange network in accordance with an embodiment of the present invention.

FIG. 11 illustrates connectivity between a PC 1100, a remote media storage 1101 and personal media capture devices 1102 when the PC 1100 is used as the primary distributor of digital media such as in the case of PC-to-PC operation, in accordance with an embodiment of the present invention. The personal media capture devices 1102 and the remote media storage 1101 connect to the PC 1100 via a wireless connection or a wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling and addressing.

In summary, some embodiments of the present invention provide systems and methods to provide secure anonymity of devices on a media exchange network.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for preventing unauthorized access to a network device, comprising:
    a headend coupled to a communications network; and
    a network device deployed in a home environment and communicatively coupled to the communications network via the headend,
    wherein the headend is adapted to determine whether a request to access the network device is authorized.

2. The system according to claim 1, wherein the headend is adapted to perform at least one of Internet protocol (IP) registration, identification registration and digital rights management.

3. The system according to claim 1, wherein the headend is adapted to perform at least one of channel/program set up, channel/program management, anonymous proxy services, media caching, media storage, billing and tracking.

4. The system according to claim 1, wherein the headend is adapted to process at least one of a device identification, an IP address, a digital certificate and a key.

5. The system according to claim 1, wherein the headend is adapted to store at least one of a device identification, a public key, a hashing signature and an IP address.

6. The system according to claim 1, wherein the headend is adapted to prevent unauthorized data from reaching the network device.

7. The system according to claim 6, wherein the data is received by the headend from the communications network.

8. The system according to claim 1, wherein the headend is adapted to determine whether a particular service provider, which is seeking access to the network device, is authorized to send data to the network device.

9. The system according to claim 1, wherein the headend is adapted to employ at least one of authentication techniques, encryption techniques and decryption techniques.

10. The system according to claim 1, wherein the headend is adapted to facilitate pushing a file residing in an authorized device to the network device or to a storage device coupled to the network device.

11. The system according to claim 10, wherein the pushed file is transported though the headend to the network device or to the storage device coupled to the network device.

12. The system according to claim 1, further comprising:
    a service provider coupled to the communications network and attempting to access the network device via the headend,
    wherein the service provider provides at least one of a password or a code to the headend so that the headend can determine whether the service provider is authorized to access the network device.

13. The system according to claim 1, wherein the network device comprises at least one of a computer, a storage device, set-top box circuitry, a television, a display and a remote control.

14. The system according to claim 1, wherein the communications network comprises an IP-based communications network.

15. The system according to claim 1, wherein the headend comprises at least one of a cable headend, a satellite headend and a digital subscriber line (DSL) headend.

16. The system according to claim 1, wherein the headend is adapted to provide at least some of the functionality of a media exchange server.

17. A method for preventing unauthorized access in a communications network, comprising:
    (a) receiving, at a headend, a request to access a first device in a home network, the request originating from a second device;
    (b) determining, by the headend, whether the second device is authorized to access the first device; and
    (c) blocking the second device from accessing the first device if the headend determines that the second device is not authorized to access the first device.

18. The method according to claim 17, further comprising:
    (d) allowing the second device to access the first device if the headend determines that the second device is authorized to access the first device.

19. The method according to claim 18, wherein allowing the second device to access the first device comprises pushing data onto the first device or onto a storage device coupled to the first device.

20. The method according to claim 19, wherein pushing data comprises transporting data from the second device, through the headend, and to the first device or to the storage device coupled to the first device.

21. A method for preventing unauthorized access in a communications network, comprising:
    (a) disposing a headend between a first network device of a home network and a second network device such that a communications path between the second network device and the first network device passes through the headend; and
    (b) adapting the headend to determine whether the second device is authorized to access the first device.

22. The method according to claim 21, further comprising:
(c) blocking the second device from accessing the first device if the second device is determined by the headend not to be authorized to access the first device.

23. The method according to claim 21, further comprising:
(c) allowing the second device to access the first device if the second device is determined by the headend to be authorized to access the first device.

24. The method according to claim 21, further comprising:
(c) adapting the headend to provide at least some of the functionality of a media exchange server.

25. The method according to claim 21, wherein adapting the headend comprises adapting the headend to perform at least one of Internet protocol (IP) registration, identification registration and digital rights management.

26. The method according to claim 21, wherein adapting the headend comprises adapting the headend to perform at least one of anonymous proxy services, media caching, media storage, billing and tracking.

27. The method according to claim 21, wherein adapting the headend comprises adapting the headend to process at least one of a device identification, an IP address, a digital certificate and a key.

* * * * *